United States Patent
Fasoli et al.

(10) Patent No.: US 10,423,763 B2
(45) Date of Patent: *Sep. 24, 2019

(54) CONTROLLING USE OF SHARED CONTENT ITEMS BASED ON CLIENT DEVICE

(71) Applicant: Apple Inc., Cupertino, CA (US)

(72) Inventors: Gianpaolo Fasoli, Redwood City, CA (US); Apoorva Govind, San Jose, CA (US); Augustin J. Farrugia, Los Altos Hills, CA (US); Raffi T. Khatchadourian, Brooklyn, NY (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,388

(22) Filed: Jun. 19, 2018

(65) Prior Publication Data

US 2018/0365390 A1    Dec. 20, 2018

Related U.S. Application Data

(63) Continuation of application No. 14/634,405, filed on Feb. 27, 2015, now Pat. No. 10,002,236.

(Continued)

(51) Int. Cl.
| | |
|---|---|
| *G06F 21/10* | (2013.01) |
| *H04W 4/60* | (2018.01) |
| *G06F 16/22* | (2019.01) |
| *H04L 29/06* | (2006.01) |
| *H04N 21/254* | (2011.01) |
| *H04N 21/6334* | (2011.01) |

(52) U.S. Cl.
CPC .......... *G06F 21/10* (2013.01); *G06F 16/2228* (2019.01); *H04L 63/061* (2013.01); *H04L 63/104* (2013.01); *H04W 4/60* (2018.02); *G06F 2221/0717* (2013.01); *H04L 2463/101* (2013.01); *H04N 21/2541* (2013.01); *H04N 21/63345* (2013.01)

(58) Field of Classification Search
CPC ....................................................... G06F 21/10
USPC ........................................................ 726/30
See application file for complete search history.

(56) References Cited

U.S. PATENT DOCUMENTS 7,296,158 B2    11/2007    Staddon
8,613,103 B2    12/2013    Holtzman
(Continued)

FOREIGN PATENT DOCUMENTS

KR    1020040023092 A1    3/2004

*Primary Examiner* — Jacob Lipman
(74) *Attorney, Agent, or Firm* — Blank Rome LLP (57) ABSTRACT

User accounts can be linked together to form a group of linked user accounts that can access content items assigned to the other user accounts in the group. A user can download content items assigned to their user account, as well as shared content items assigned to one of the other user accounts in the group of linked user accounts. Use of shared content items can be restricted to client devices running specified versions of an operating system. The key ID tagged to a shared content item can be altered such that the key ID no longer correctly identifies the corresponding DRM key that enables use of the shared content item. Client devices authorized to use shared content items can be configured to recognize that a content item is a shared content item and generate the original key ID form the altered key ID.

20 Claims, 7 Drawing Sheets

Related U.S. Application Data (60) Provisional application No. 62/027,117, filed on Jul. 21, 2014.

(56) References Cited

U.S. PATENT DOCUMENTS

| | | |
|---|---|---|
| 8,750,519 B2 | 6/2014 | Suu |
| 2005/0239454 A1 | 10/2005 | Kawashima |
| 2008/0199006 A1 | 8/2008 | Gandolph |
| 2009/0222348 A1 | 9/2009 | Ransom |
| 2013/0091214 A1 | 4/2013 | Kellerman |
| 2015/0347996 A1* | 12/2015 | Alsina ................ G06Q 20/1235 705/44 |

* cited by examiner

FIG. 2A

| Account Identifier | Content Item Identifier | Linked Accounts |
|---|---|---|
| 1 | 11, 12 | |
| 2 | 13 | |
| 3 | 14, 15, 16 | |

205 → (row 1), 210 → (row 2), 215 → (row 3)

FIG. 2B

| Account Identifier | Content Item Identifier | Linked Accounts |
|---|---|---|
| 1 | 11, 12 | 2, 3 |
| 2 | 13 | 1, 3 |
| 3 | 14, 15, 16 | 1, 2 |

205 → (row 1), 210 → (row 2), 215 → (row 3)

FIG. 2C

| Account Identifier | Content Item Identifier | Linked Accounts |
|---|---|---|
| 1 | 11, 12 | |
| 2 | 13 | 3 |
| 3 | 14, 15, 16 | 2 |

205 → (row 1), 210 → (row 2), 215 → (row 3)

CONTROLLING USE OF SHARED CONTENT ITEMS BASED ON CLIENT DEVICE

RELATED APPLICATIONS

This application is a continuation of U.S. application Ser. No. 14/634,405, entitled "CONTROLLING USE OF SHARED CONTENT ITEMS BASED ON CLIENT DEVICE," filed on Feb. 27, 2015, which claims the benefit of U.S. Provisional Application No. 62/027,117, entitled "CONTROLLING USE OF SHARED CONTENT ITEMS BASED ON CLIENT DEVICE," filed on Jul. 21, 2014, both of which are hereby expressly incorporated by reference in their entireties

TECHNICAL FIELD

The present technology pertains to sharing content items, and more specifically pertains to controlling use of shared content items based on client device.

BACKGROUND

Online stores allow users to purchase a variety of content items from the comfort of their computing device. For example, online media stores allow users to purchase a variety of electronic content items such as music, movies, books, etc., which a user can access from their computing device(s). While users can easily purchase these items online, sharing these items with family members can be difficult. Oftentimes, access to purchased content items is restricted to the user account that purchased the content item. Therefore, a user that purchased content item cannot share the content item with other members of their family.

To alleviate this problem, many families share a single user account to make content item purchases. While sharing a single user account allows multiple family members to access purchased content items, this technique also provides several problems. For example, by sharing a single user account, purchases made by each family member affect the user profile associated with the purchasing user account. Therefore, a father that allows his children to purchase songs using the father's user account may receive recommendations based on the purchases made by the children because the system cannot discern between purchases made by the father and purchases made by his children.

Another problem with sharing a single user account is that the purchased content items are associated with the user account used to purchase the content items and cannot be transferred to another user account. This can be problematic when a family member wants to create a separate user account. For example, a child leaving for college may wish to have their own user account, separate from the user account shared with the child's father. The child has no way to transfer the child's content items purchased with the father's user account. Accordingly, there is a need for an improved method of sharing purchased content items between family members.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for controlling use of a shared content time based on client device. One or more user accounts can be linked together to form a group of linked user accounts. When linked, the user accounts in the group of linked user accounts can access content items assigned to the other user accounts in the group of linked user accounts. This can allow family members to link their user accounts into a group of linked user accounts to share their purchases, photos, etc., with the other members of their family.

A user can download content items to their client device. For example, a user can download the content items assigned to their user account, as well as shared content items, which are content items that are assigned to one of the other user accounts in the group of linked user accounts but not the downloading user's account. Downloaded content items can require a Digital Rights Management (DRM) key that enables use of the content item by a client device. Prior to being transmitted to a client device, content items can be tagged with a key identifier (ID) that identifies the corresponding DRM key needed to enable use of the content item. The client device can access the key ID tagged to a content item to identify the corresponding DRM key and enable use of the content item.

In some embodiments, use of shared content items can be restricted to certain types of client devices, such as client devices running a certain software or version of software. For example, use of shared content items can be restricted to client devices that are running one or more specified versions of an operating system. Client devices that are not running one of the specified versions of the operating system can be restricted from using the shared content items. Non-shared content items that are assigned to the downloading user's account can be free from this restriction and thus be used by all client devices regardless of the version of the operating system running on a client device.

To control access to shared content items, the key ID tagged to a shared content item can be altered such that the key ID no longer correctly identifies the corresponding DRM key that enables use of the shared content item. Client devices authorized to use shared content items can be configured to recognize that a content item is a shared content item and generate the original key ID from the altered key ID tagged to a shared content item. The client device can then identify the DRM key corresponding to the shared content item and enable use of the shared content item by the client device. Client devices that are not authorized to use shared content items will not include functionality to recognize that a content item is a shared content item and to generate the original key ID from the altered key ID. As a result, client devices not authorized to use shared content items will attempt to locate the DRM key corresponding to a shared content item using the altered key ID, resulting in an error and thereby restricting the unauthorized client device from using the content item.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for controlling use of a shared content time based on client device. One or more user accounts can be linked together to form a group of linked user accounts. When linked, the user accounts in the group of linked user accounts can access content items assigned to the other user accounts in the group of linked user accounts. This can allow family members to link their user accounts into a group of linked user accounts to share their purchases, photos, etc., with the other members of their family.

A user can download content items to their client device. For example, a user can download the content items assigned to their user account, as well as shared content items, which are content items that are assigned to one of the other user accounts in the group of linked user accounts but not the downloading user's account. Downloaded content items can require a Digital Rights Management (DRM) key that enables use of the content item by a client device. Prior to being transmitted to a client device, content items can be tagged with a key identifier (ID) that identifies the corresponding DRM key needed to enable use of the content item. The client device can access the key ID tagged to a content item to identify the corresponding DRM key and enable use of the content item.

In some embodiments, use of shared content items can be restricted to certain types of client devices, such as client devices running a certain software or version of software. For example, use of shared content items can be restricted to client devices that are running one or more specified versions of an operating system. Client devices that are not running one of the specified versions of the operating system can be restricted from using the shared content items. Non-shared content items that are assigned to the downloading user's account can be free from this restriction and thus be used by all client devices regardless of the version of the operating system running on a client device.

To control access to shared content items, the key ID tagged to a shared content item can be altered such that the key ID no longer correctly identifies the corresponding DRM key that enables use of the shared content item. Client devices authorized to use shared content items can be configured to recognize that a content item is a shared content item and generate the original key ID from the altered key ID tagged to a shared content item. The client device can then identify the DRM key corresponding to the shared content item and enable use of the shared content item by the client device. Client devices that are not authorized to use shared content items will not include functionality to recognize that a content item is a shared content item and to generate the original key ID from the altered key ID. As a result, client devices not authorized to use shared content items will attempt to locate the DRM key corresponding to a shared content item using the altered key ID, resulting in an error and thereby restricting the unauthorized client device from using the content item.

Figure 1:
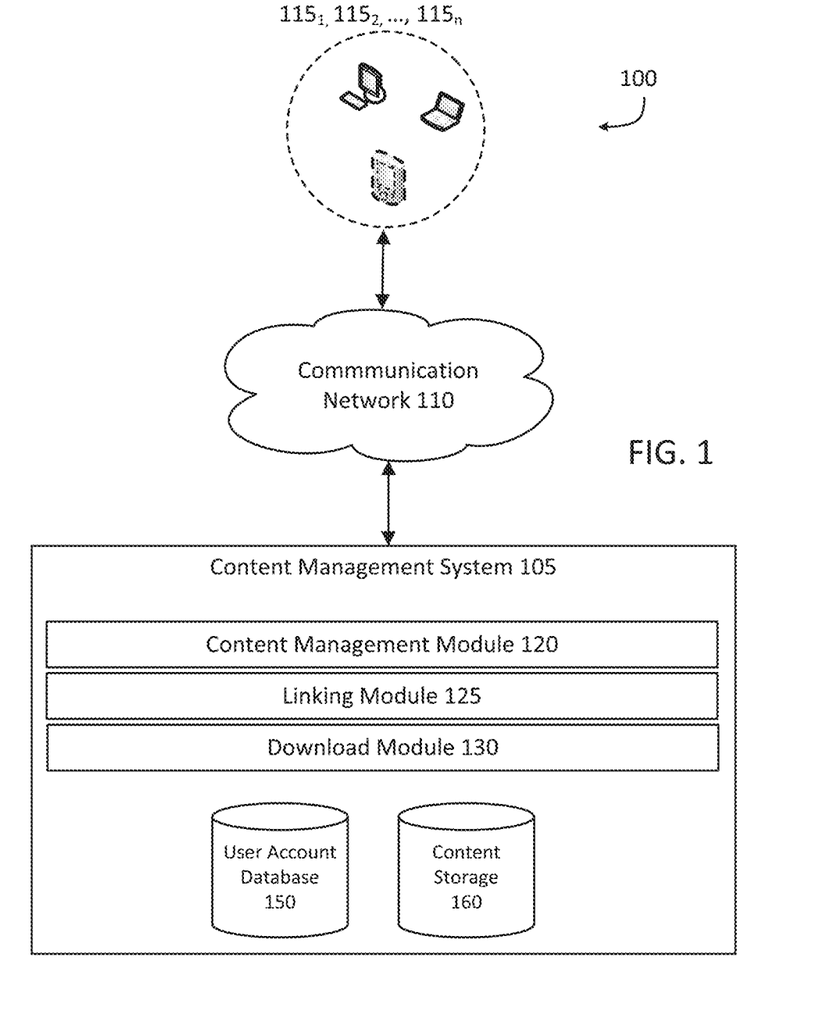
FIG. 1 illustrates an exemplary configuration of devices and a network in accordance with the invention.

FIG. 1 illustrates an exemplary system configuration 100, wherein electronic devices communicate via a network for purposes of exchanging content and other data. As illustrated, multiple computing devices (client devices 115 and content management system 105) can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communications links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 700 of FIGS. 7A and 7B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can interact with content management system 105 through client devices $115_1$, $115_2$, . . . , $115_n$ (collectively "115") connected to communication network 110 by direct and/or indirect communication. Content management system 105 can support connections from a variety of different client devices 115, such as desktop computers; mobile computers; mobile communications devices, e.g. mobile phones, smart phones, tablets; smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with the content management system 105 via a client-side application integrated with the file system or via a webpage displayed using a web browser application.

Content management system 105 can be configured to manage content items for multiple user accounts. For example, content management system 105 can allow users to purchase, store and access content items. Furthermore, content management system 105 can make it possible for a user to access the content items from multiple client devices 115. Accessing a content item can include receiving metadata describing the content item, streaming the content item from content management system 105, downloading the content item or purchasing the content item.

To facilitate the various content management services, a user can create a user account with content management system 105. The account information for each created user account can be maintained in user account database 150. User account database 150 can store profile information for each user account, including a unique account identifier identifying the user account, personal information, username, password, email address, address, credit card information, banking information, client devices belonging to the user, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, image files, etc. In some embodiments, a content item can be an item that is subject to a licensing restriction. For example, content management system 105 can provide an online content store where users can purchase a variety of content items. Further, in some embodiments, a user can upload content items from one of client devices 115 to content management system 105. The purchased and uploaded content items can be assigned to the user's user account and then accessed by the user from any of client devices 115 when logged into the user's user account. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details from client devices 115 so that client devices 115 do not need require information detailing the exact location at which the content items are being stored by content management system 105. Content management system 105 can store the content items in a network accessible storage (NAS) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 120 configured to manage and access each user account and the content items assigned to the user accounts. For example, content management module 120 can be configured to communicate with user account database 150 and content storage 160 to adjust privileges with respect to content items and otherwise manage content items.

A user can communicate with content management system 105 via client device $115_i$ to request to login into their user account. Content management system 105 can require that a user provide login credentials, such as a user name and password, to login into their user account. Upon receiving the correct login credentials for a user account, content management system 105 can authorize the requesting user's client device $115_i$ on the user account, thereby allowing client device $115_i$ to access content items assigned to the user account, make purchases with the payment method associated with the user account, assign content items to the user account, upload content items, etc.

In some embodiments, content management system 105 can limit the number of user accounts on which a client device 115 can be authorized at a time. For example, content management system 105 can limit a client device to being authorized on no more than one user account at a time. This can require a client device $115_i$ to log out of a user account prior to logging into a different user account, thereby authorizing the client device on the different user account.

While content management system 105 can be configured to limit client devices 115 to being authorized on only one user account at a time, content management system 105 can allow for multiple client devices 115 to be authorized on the same user account simultaneously. This can allow a user to access their user account from multiple devices, such as their tablet PC, desktop PC and smartphone.

Upon a user logging into their user account from client device $115_i$, thereby authorizing client device $115_i$ on their user account, content management module 120 can access the account information associated with the user account to identify the content items assigned to the user account, as well as account configuration data dictating presentation of the content items. Content management module 120 can then present and/or provide the content items to client device $115_i$ according to the account configuration data. For example, content management module 120 can access a user account to identify the content item identifiers assigned to the user account. The content item identifier can then be used to identify and locate the content items assigned to the user account, which can be transmitted to client device $115_i$, where they can be presented according to the account configuration data.

Presenting the content items can include transmitting metadata describing the content items to client device $115_i$ that is authorized on the user account. Client device $115_i$ can then use the received metadata to present the content items that the user account can access. For example, client device $115_i$ can present information identifying the content items in a content item library available to the user account. This can include presenting the title of the content item, an image such as an album or book cover, description, etc.

Content management module 120 can also assign content items to a user account. For example, upon a user purchasing or uploading a content item, content management module 120 can add a content item identifier identifying the purchased content item to the user account in account database 150, thus enabling the user account to access the content item.

In some embodiments, content management system 105 can be configured to link multiple user accounts together to form a group of linked user accounts so that content items assigned to each of the individual user accounts can be accessed by each of the user accounts in the group linked user account. This can allow family members to link their user accounts together to share their content items with each other, while maintaining their personal user account.

To link user accounts together, content management system 105 can include linking module 125. In some embodiments, linking module 125 can be configured to provide an account link interface that enables a user to link their user account to other user accounts. For example, the account link interface can enable a user to request that their user account be linked to another user account and/or accept a request received from another user account. Upon logging into their user account, a user can use the account link interface to link their user account to the user account of other users.

To link multiple user accounts together, linking module 125 can be configured to modify the account information of the linked user accounts to indicate that the user accounts are linked together. For example, in some embodiments, linking module 125 can modify a user account to include the unique account identifier of each user account linked to the user account. Account management module 120 can then access a user account to identify each of the user accounts linked to the user account. Likewise, to unlink a user account, linking module 125 can modify the user account of each linked user account to remove the unique account identifier of the user accounts that are no longer linked.

Figure 2A:
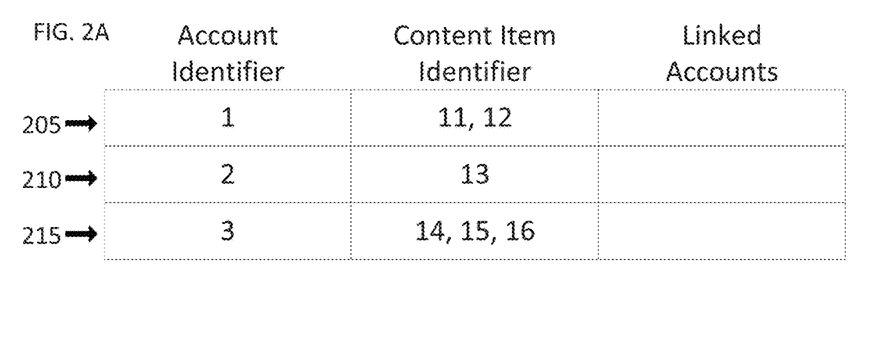
FIGS. 2A, 2B, and 2C illustrate an exemplary embodiment of linking multiple user accounts together.
Figure 2B:
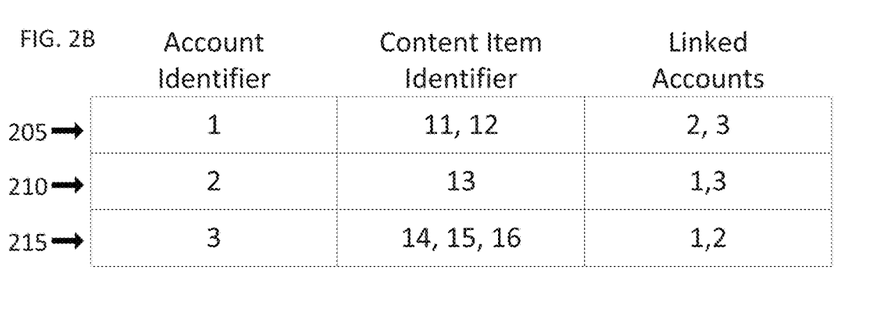
Figure 2C:
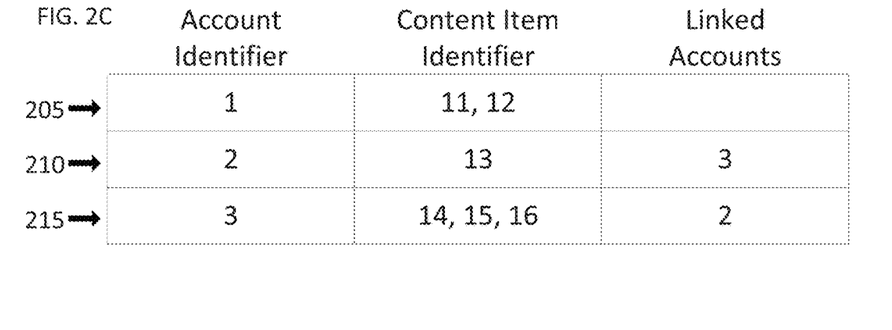

FIGS. 2A-2C illustrate an exemplary embodiment of linking multiple user accounts together. FIG. 2A, illustrates three user accounts: user account 205, user account 210 and user account 215. As shown, each user account (205, 210, 215) includes a unique account identifier field, a content item identifier field and a linked account field.

The unique account identifier field can include a unique account identifier that uniquely identifies a user account. As shown, the unique account identifier for user account 205 is 1; the unique account identifier for user account 210 is 2; and the unique account identifier for user account 215 is 3.

The content item identifier field can include content item identifiers identifying each content item assigned to the individual user account. As shown, content items 11 and 12 are assigned to user account 205, content item 13 is assigned to user account 210, and content items 14, 15 and 16 are assigned to user account 215.

The linked account field can identify the user accounts linked to a user account. For example, the linked account field can include the unique account identifier of each user account linked to the user account. As shown, none of the three user accounts (205, 210, 215) has a unique identifier in their respective linked account field, indicating that none of the user accounts (205, 210, 215) are linked to another user account. Each of the user accounts (205, 210, 215) can therefore access only the content items assigned to their respective user account. Thus user account 205 can access only content items 11 and 12, user account 210 can access only content item 13, and user account 215 can access only content items 14, 15 and 16.

FIG. 2B illustrates user accounts 205, 210 and 215 after they have been linked together to form a group of linked user accounts. As shown, user account 205 includes unique account identifiers 2 and 3 in the linked account field. This indicates that user account 205 is now linked to user accounts 210 and 215. Likewise, user account 210 includes the unique account identifiers 1 and 3 in its linked account field indicating that user account 210 is linked to user accounts 205 and 215, and user account 215 includes unique account identifiers 1 and 2 in its linked account field, indicating that user account 215 is linked to user accounts 205 and 210.

As a result of the user accounts 205, 210 and 215 being linked together, each of the user accounts (205, 210, 215) can access the content items assigned to the other user accounts, in addition to the content items assigned to the individual user account. For example, user account 205 can access content item 13 assigned to user account 210, and content items 14, 15 and 16 assigned to user account 215, in addition to the content items 11 and 12 assigned to user account 205. Likewise, user account 210 can access content items 11, 12, 14 15 and 16 in addition to the content items assigned to user account 210, and user account 215 can access content items 11, 12 and 13, in addition to the content items assigned to user account 215.

FIG. 2C illustrates user accounts 205, 210 and 215 after user account 205 has been removed from the group of linked user accounts. As shown, user account 215 no longer has any unique account identifiers listed in the linked account fields. This can indicate that user account 205 is no longer linked to any other user account. Further, the linked account fields of user accounts 210 and 215 have also been modified to remove the unique account identifier of user account 205, indicating that user accounts 210 and 215 are no longer linked to user account 205.

While user account 205 has been unlinked from user accounts 210 and 215, user accounts 210 and 215 remain linked to each other, as indicated by the linked account field of user accounts 210 and 215. As a result, user account 205 can access only the content items assigned to user account 205, and can no longer access the content items assigned to user accounts 210 and 215. Likewise, user accounts 210 and 215 can no longer access the content items assigned to user account 205, however user accounts 210 and 215 can still access the content items assigned to the other account. Thus, user account 205 can only access content items 11 and 12, whereas user accounts 210 and 215 can each access content items 13, 14, 15 and 16, but not content items 11 and 12.

Although listing unique account identifiers in a user account is used as one example of how user accounts can be linked together, this is only one possible embodiment and is not meant to be limiting. Linking multiple user account together can be performed in any of numerous ways known in the art.

In some embodiments, a group of linked user accounts can be assigned a unique group identifier that identifies the group of linked user accounts. Each user account can include a listing of unique group identifiers that identify each group of linked user accounts to which the user account is a member. Further, a group index can be used to identify the user accounts included in each group of linked user accounts. For example, a group index can list each unique group identifier along with the unique account identifier for each user account included in the group. To identify the user accounts linked to a user account, the user account can be accessed to gather the group identifiers associated with the user account. The group identifiers can then be used to search the group index to identify the user accounts included in each group.

Returning to the discussion of FIG. 1, content management system 105 can be configured to enable users to download content items from content management system 105 to client devices 115. For example, content management system 105 can be configured to enable a user to download content items assigned to the user's account, as well as shared content items that are assigned to one of the other user accounts in the group of linked user accounts. Once downloaded to client device $115_i$, the content item can be used by client device $115_i$ even while client device $115_i$ is not in network connection with content management system 105. Using a downloaded content item can include opening, executing, reading, performing, or using the downloaded content item for any other intended purpose.

Content management system 105 can include download module 130 configured to receive download requests from client devices 115. A download request can be a request to download a content item from content management system 105 to a requesting client device $115_i$. For example, a user can use client device $115_i$ to request to download a content item that the user has access to. This can include content items assigned to the requesting user's account and/or shared content items that are assigned to a user account linked to the requesting user's account. Client device $115_i$ can transmit a download request to content management system 105 for the requested content item. In response to receiving a download request, download module 130 can identify the requested content item and transmit the requested content item to requesting client device $115_i$.

Some downloaded content items can require a Digital Rights Management (DRM) key to enable use of the content item. To facilitate use of a content item downloaded by client device $115_i$, download module 130 can provide a DRM key corresponding to the content item to client device $115_i$; the DRM key can enable use of the content item by client device $115_i$. For example, download module 130 can transmit the DRM key to client device $115_i$ at or near the same time that download module 130 transmits the content item to client device $115_i$.

Download module 130 can tag a content item with a key identifier (ID) that identifies the DRM key corresponding to the content item. Client device $115_i$ can be configured to gather the key ID from a downloaded content item to locate the appropriate DRM key to enable use of the content item. If client device $115_i$ cannot locate the appropriate DRM key identified by the key ID, client device $115_i$ cannot use the content item. Alternatively, if client device $115_i$ can locate the corresponding DRM key, client device $115_i$ can use the DRM key to enable use of the content item.

In some embodiments, use of shared content items can be restricted based on the client device $115_i$ attempting to use the content item. This can include restricting access to shared content items based whether client device $115_i$ includes a specified software or version of the software. For example, shared content items can be restricted such that only client devices 115 running one or more specified version of an operating system can use the shared content item, whereas client devices 115 that are not running the specified version of the operating system cannot use the shared content item. Non-shared content items, such as those assigned to the downloading user's account, can remain unrestricted such that the non-shared content items can be used by client devices 115 regardless of the version of the operating running on the client devices 115.

Prior to transmitting a content item to client device $115_i$, download module 130 can determine whether the content item is a shared content item and, if so, flag the content item as a shared content item. This can include setting a share flag associated with the shared content item to '1' or 'true' or, alternatively, tagging the shared content item with the group identifier for the group of linked user account from which the shared content item is being shared. For example, download module 130 can compare the account identifier for the user account requesting to download the content item to the account identifiers to which the content item is assigned. If the account identifiers do not match, download module 130 can determine that the requested content item is a shared content item that is not assigned to the downloading user account. If the account identifiers do match, download module 130 can determine that the requested content item is assigned to the requesting user's account and therefore is not a shared content item. Download module 130 can transmit non-shared content items without flagging the content item as a shared content item, i.e. setting the share flag or tagging the content item with the group identifier.

Prior to transmitting a shared content item to requesting client device $115_i$, download module 130 can alter the key ID tagged to the shared content item, resulting in the key ID no longer identifying the DRM key corresponding to the content item. Client device $115_i$ will therefore not be able to identify the DRM key corresponding to the content item using the altered key ID. Client devices 115 that are authorized to use shared content item can include functionality to identify that a content item is a shared content item and generate the original value of the key ID from the altered key ID, thereby enabling the client device to identify the DRM key corresponding to the content item. Client devices 115 that are not authorized to use shared content items will not include the functionality to identify that a content item is a shared content item and generate the original key ID from the altered key and therefore will not be able to use shared content items.

Download module 130 can alter the key ID for a shared content item in numerous ways. For example, download module 130 can increment the key ID by a specified amount. Alternatively, download module 130 can increment or flip a specified bit from the bit set representing the key ID, thereby altering the key ID. For example, download module 130 can flip a high bit that is likely unused to represent the original key ID value.

Client devices 115 that are authorized to use shared content items can include functionality to generate the original key ID by reversing the alteration performed by download module 130. For example, authorized client devices 115 can decrement the key ID tagged to a shared content item by the specified amount or decrement or flip the specified bit in the bit set representing the key ID, thereby generating the original value of the key ID.

Figure 3:
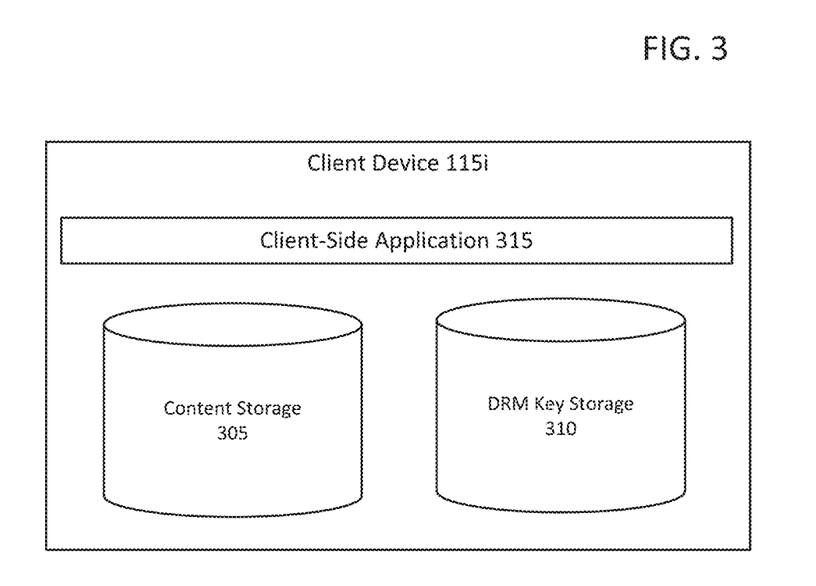
FIG. 3 illustrates an exemplary system embodiment of a client device.

FIG. 3 illustrates an exemplary system embodiment of a client device. As shown, client device $115_i$ includes content storage 305 and DRM key storage 310. Client device $115_i$ can store downloaded content items in content storage 305 and DRM keys in DRM key storage 310.

Client device $115_i$ can also include client-side application 315 that facilitates communication with content management system 105 and/or use of content items downloaded from content management system 105. In some embodiments, client-side application 315 can include a content management system 105 specific component. For example, the component can be a stand-alone application, one or more application plug-ins, and/or a browser extension. However, client-side application 315 can also be a third-party application, such as a web browser, that resides on client device $115_i$ and is configured to communicate with content management system 105. In either case, client-side application 315 can present a user interface (UI) for the user to interact with content management system 105 and/or content items downloaded from content management system 105. In some embodiments, client-side application 315 can be integrated with the file system or operating system running on client device $115_i$.

Client-side application 315 can enable a user to request use of a content item stored in content storage 305. For example client-side application 315 can present a content interface that presents the available content items to the user as well as enables the user to select an available content item for use. Upon receiving an input from a user to use a content item, client-side application 315 can access the requested content item in content storage 305 and gather the key ID tagged to the content item. Client-side application 315 can search for the DRM key identified by the key ID in DRM key storage 310. If client-side application 315 locates the identified DRM key in DRM key storage 310, client-side application 315 can use the DRM key to enable use of the content item. Alternatively, if client side-application 315 cannot locate the DRM key, client-side application 315 cannot enable use of the content item.

If client device $115_i$ is authorized to use a shared content item, client-side application 315 can include additional functionality to determine whether a content item is a shared content item and, if so, generate the original value of the key ID from the altered key ID tagged to the shared content item. Client-side application 315 can then use the generated original value of the key ID to locate the corresponding DRM key in DRM key storage 310 and enable use of the shared content item. Use of shared content items can be restricted to client devices that include a specified version of client-side application 315 that includes functionality to determine if a content item is a shared content item and generate the original value of a key ID from an altered key ID tagged to a shared content item. For example, the specified version of client-side application 315 can be included in a specified operating system update, thereby requiring a user to perform the update to enable use of shared content items by their client device $115_i$.

To identify if a content item is a shared content item, client-side application 315 can check whether the content item is flagged as a shared content item, either by checking the share flag or determining whether the content item is tagged with a group identifier. If a content item is flagged as being a shared content item, client-side application 315 can determine that the content item is a shared content item and thus the key ID tagged to the content item has been altered.

Alternatively, if the content item is not tagged with a group identifier, client-side application 315 can determine that the content item is not a shared content item and thus the key ID tagged to the content item has not been altered.

If client device $115_i$ is not authorized to use shared content items, client-side application 315 will not include functionality to determine whether a content item is a shared content item and, if so, generate the original value of the key ID from the altered key ID tagged to the content item. As a result, client-side application 315 will use the altered key ID tagged to a shared content item to search for the corresponding DRM key in DRM key storage 310, resulting in the DRM key not being located.

Figure 4A:
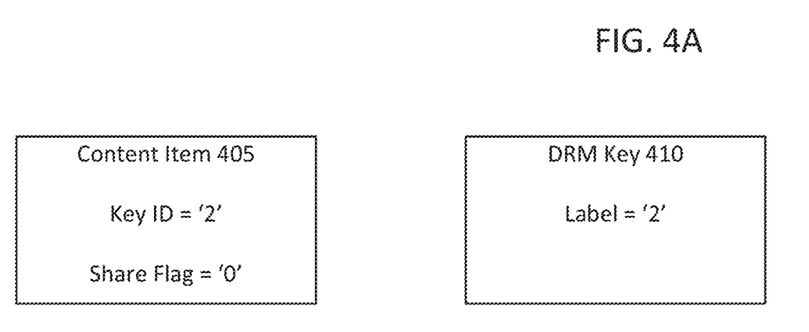
FIGS. 4A and 4B illustrate an example of altering the key ID for a shared content item and generating the original key value from the altered key ID.
Figure 4B:
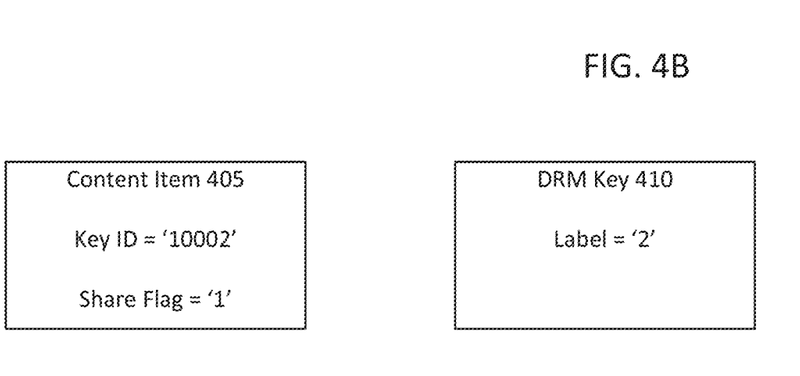

FIGS. 4A and 4B illustrate an example of altering the key ID for a shared content item and generating the original key value from the altered key ID. FIG. 4A shows content item 405 and DRM key 410. DRM key 410 corresponds to content item 405 such that DRM key 410 is required to enable use of content item 405 by a client device. As shown, DRM key 410 is labeled '2' and, accordingly, content item 405 is tagged with a key ID value of '2' to properly identify DRM key 410. Further, the share flag is set to '0', indicating that content item 405 is not a shared content item.

If a user requests to download content item 405 to their client device and content item 405 is assigned to the requesting user's account, content item 405 is not a shared content item and can be transmitted with a key ID value of '2' and share flag value of '0', as shown in FIG. 4A. Further, DRM key 410 can also be transmitted to the requesting client device. The client device can gather the key ID value tagged to content item 405 to identify corresponding DRM key 410 that enables use of content item 405. For example, the client device can gather the key ID value '2' from content item 405 and search for corresponding DRM key 410 that is labeled '2' and will enables use of content item 405 by the client device.

The key ID for content item 405 can be altered if content item 405 is downloaded as a shared content. FIG. 4B shows content item 405 transmitted as a shared content item. As shown, DRM key 410, which enables use of content item 405, remains labeled '2', however the key ID tagged to content item 405 has been altered to flip the fifth bit from a '0' to a '1', thereby changing the key ID value from '2' to '10002'. As a result, the key ID no longer identifies DRM key 410. Further, the share flag for content item 405 has been changed to '1', indicating that content item 405 is a shared content item.

A client device that is not authorized to use shared content items will attempt to locate corresponding DRM key 410 using the altered key ID value of '10002' and, as a result, will not locate DRM key 410. A client device that is authorized to use shared content items will include functionality to determine whether content item 405 is a shared content item and, if so, generate the original key ID value from the altered key ID.

A client device that is authorized to use shared content items can check the share flag of content item 405 to determine that content item 405 is a shared content item. The client device can then generate the original value of the key ID by flipping the fifth bit back to '0' from '1', resulting in the original value of the key ID '2'. Alternatively, the client device can simply ignore the fifth bit when gathering the key ID from content item 405. The client device can then use the original value of the key ID to locate DRM key 410 and enable use of content item 405.

It should be noted that client devices that are authorized to use shared content item and client devices that are not authorized to use shared content item can both access a content item that is not a shared content item. Either client device can use the unaltered key ID tagged to a content item to locate the DRM key corresponding to the content item, thereby enabling use of the content item. In contrast, only client devices that are authorized to use shared content items will include functionality to generate the original key ID from the altered key ID and thus locate the DRM key corresponding to the client device. Client devices that are not authorized to use a shared content item will attempt to locate the DRM key with the altered key ID, resulting in the client device not locating the DRM key.

Figure 5:
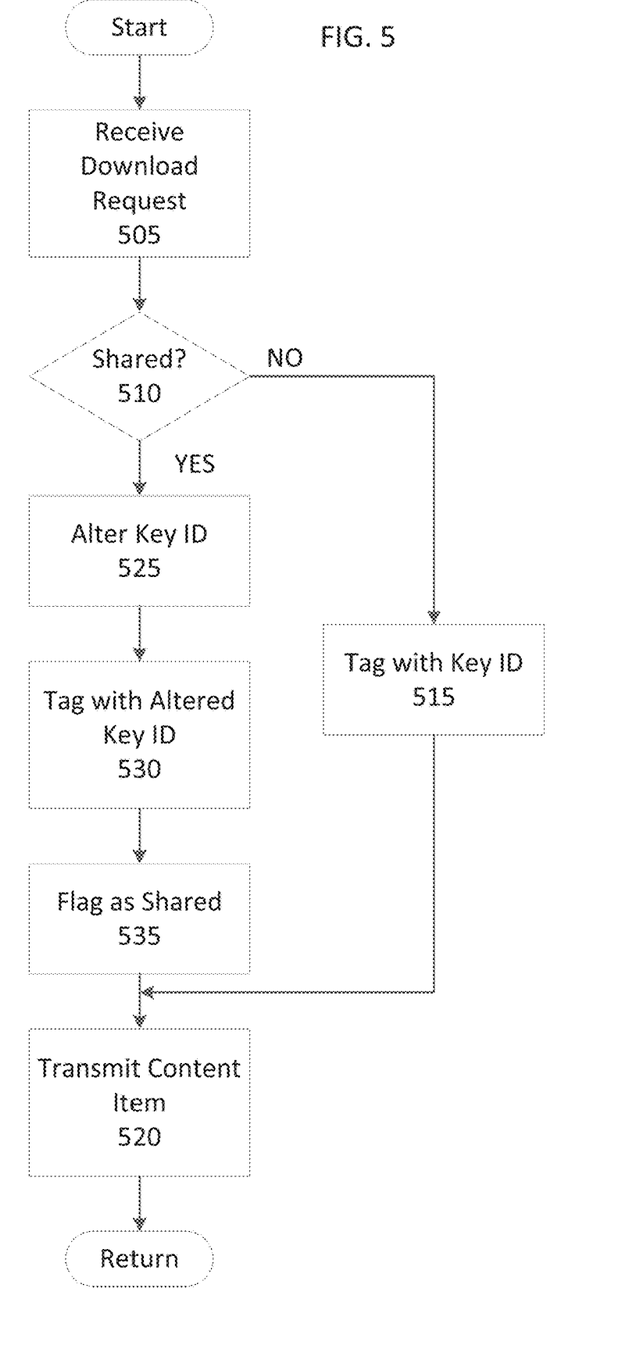
FIG. 5 illustrates an exemplary method embodiment of controlling use of a content item based on client device.

FIG. 5 illustrates an exemplary method embodiment of controlling use of a content item based on the client device. The method will be described in view of the system described in FIG. 1 and the accompanying text. As shown, the method begins at block 505 where content management system 105 receives a download request from one of client devices 115. A download request can be a request to download a content item from content management system 105 to a requesting client device $115_i$.

At block 510, content management system 105 can determine whether the content item is being requested as a shared content item. A shared content item can be a content item that is not assigned to the requesting user's account, but rather assigned to a user account that is linked to the requesting user's account.

If at block 510, content management system 105 determines that the content item is not a shared content item, the method continues to block 515 where content management system 105 tags the content item with a key ID value that identifies the DRM key corresponding to the content item and enables use of the content item. The method then continues to block 520 where content management system 105 transmits the content item to the requesting client device $115_i$. In some embodiments, client device $115_i$ can transmit the DRM key corresponding to the content item along with the content item.

Alternatively, if at block 510 content management system 105 determines that the content item is not assigned to the requesting user's account and is thus a shared content item, the method continues to block 525 where content management system 105 alters the key ID identifying the DRM key corresponding to the content item. Content management system 105 can be configured to alter the key ID in numerous ways, although the method used to alter to the key ID should be consistent for each shared content item. For example, in some embodiments, content management system 105 can alter the key ID by flipping a predetermined bit from the bit set representing the key ID. The predetermined bit can be a high bit to ensure that the bit is most likely not in use and thus set to '0'. For example, the predetermined bit can be the 21st bit and flipping the bit can change the value from '0' to '1'.

At block 530, content management system 105 can tag the content item with the altered key ID. At block 535 content management system 105 can flag the content item as being a shared content item. In some embodiments, content management system 105 can flag the content item as a shared content item by setting a share flag associated with the content item to '1' or 'true'. Alternatively, in some embodiments, content management system 105 can flag a content item as a shared content item by tagging the content item with the group identifier for the group of linked user accounts from which the content item was shared.

The method then continues to block 520 where content management system 105 transmits the content item to the requesting client device $115_i$. In some embodiments, client device $115_i$ can transmit the DRM key corresponding to the content item along with the content item.

Figure 6:
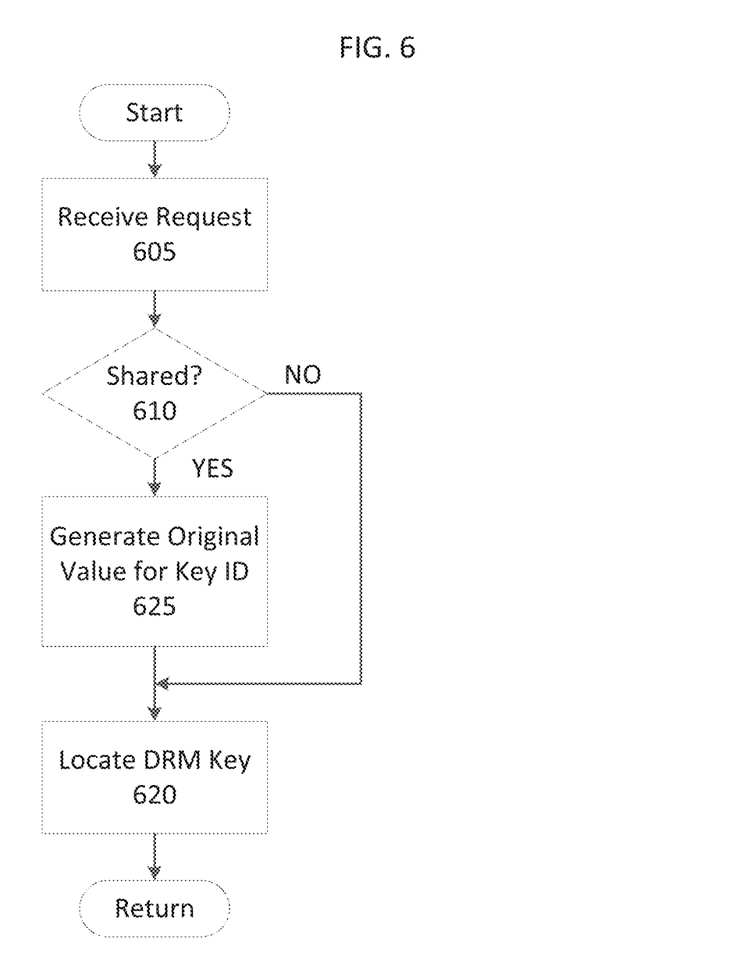
FIG. 6 illustrates an exemplary method embodiment of using a content item on a client device authorized to use shared content items.

FIG. 6 illustrates an exemplary method embodiment of using a content item on a client device authorized to use shared content items. The method will be described in view of the system described in FIG. 3 and the accompanying text. As shown, the method begins at block 605 where client device $115_i$ receives a request to access a content item downloaded to client device $115_i$. For example, a user of client device $115_i$ can select to play a content item such as a movie downloaded to client device $115_i$.

At block 610, client device $115_i$ can determine if the content item is a shared content item. For example client device $115_i$ can check whether the share flag associated with the content item is set to '1' or 'true', indicating that the content item is a shared content item. Alternatively, client device $105_i$ can check whether the content item is tagged with a group identifier, indicating that the content item is a shared content item.

If at block 610, client device $115_i$ determines that the content item is not a shared content item, the method continues to block 620 were client device $115_i$ locates the DRM key identified by the key ID tagged to the content item. For example, client device $115_i$ can gather the key ID tagged to the content item and search for the DRM key identified by the key ID in DRM key storage 210.

Alternatively, if at block 610 client device $115_i$ determines that the content item is a shared content item, the method continues to block 615 where client device $115_i$ generates the original key ID value from the altered key ID tagged to the content item. For example, client device $115_i$ can flip the specified bit of the altered key ID to its original value, resulting in the original value of the key ID. The method then continues to block 620 where client device $115_i$ locates the DRM key identified by the original value of the key ID. If the identified DRM key is located, client device $115_i$ can enable use of the shared content item. Alternatively, if client device $115_i$ cannot locate the identified DRM key, client device $115_i$ will not be able to use the content item.

Figure 7A:
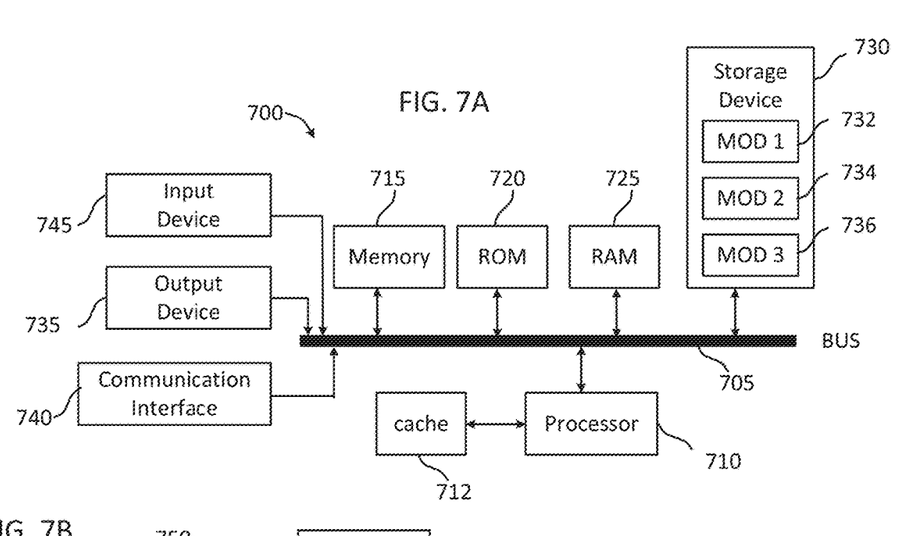
FIGS. 7A and 7B exemplary possible system embodiments.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

Figure 7B:
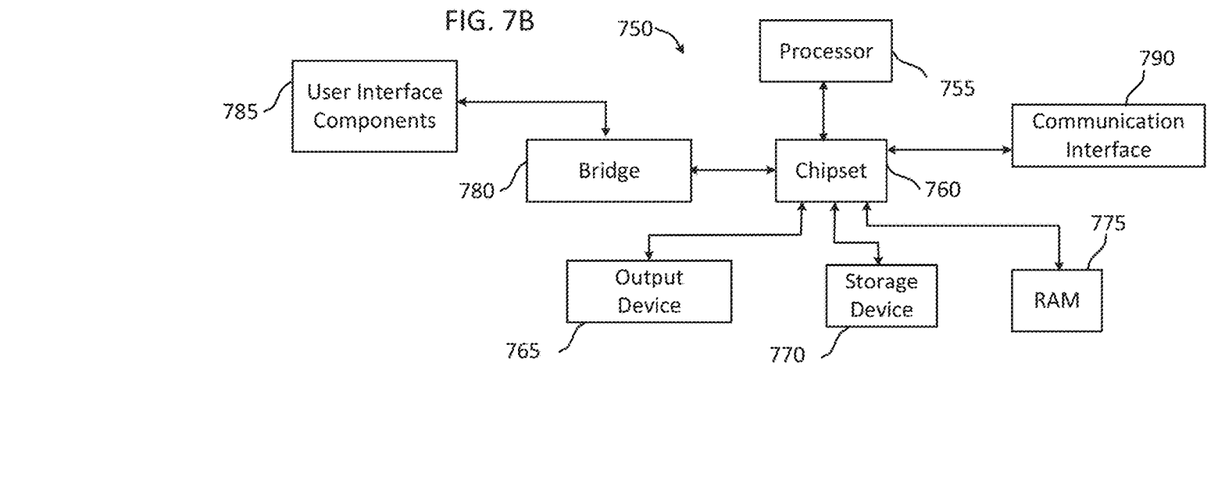

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A first client device, comprising:
an interface to receive input; and
at least one processor; and
a memory operatively coupled to the at least one processor and storing instructions which,
when executed by the at least one processor, causes the at least one processor to:
receive a request to access a content item downloaded to the first client device,
wherein an original key identifier (ID) corresponds to the content item, and the original key ID identifies a first digital rights management (DRM) key that enables access to the content item on a second client device, associated with a second user account authorized to access the content item;
determine that the content item is a shared content item and is not assigned to a first user account associated with the first client device;
generate, based on the determination that the content item is the shared content item, an altered key ID from the original key ID for the content item; and
determine that the first client device is not authorized to access the content item based on the altered key ID.

2. The first client device of claim 1, wherein the first client device is configured to use shared content items.

3. The first client device of claim 1, wherein the original key ID comprises a set of bits and further comprising instructions, which, when executed by the at least one processor, cause the at least one processor to generate the altered key ID by one of:
increment or decrement the original key ID, and
increment, decrement, or flip at least one specified bit of the set of bits.

4. The first client device of claim 1, wherein the memory further comprises instructions, which, when executed by the at least one processor, cause the at least one processor to determine that the content item is the shared content item based on an indication associated with the content item.

5. The first client device of claim 4, wherein the indication comprises one of a shared flag or tag.

6. The first client device of claim 1, wherein the first client device further comprises a storage device storing one or more DRM keys.

7. The first client device of claim 6, further comprising instructions, which, when executed by the at least one processor, cause the at least one processor to determine that the first client device is not authorized to access the content item based on a determination that the altered key ID does not identify any DRM keys stored on the first client device.

8. The first client device of claim 7, further comprising instructions, which, when executed by the at least one processor, cause the at least one processor to:
determine not to attempt to decrypt the content item based on the determination that the altered key ID does not identify any DRM keys stored on the first client device; and
generate an error message.

9. A method, comprising:
receiving a request to access a content item downloaded to a first client device,
wherein an original key identifier (ID) corresponds to the content item and the original key ID identifying a first digital rights management (DRM) key that enables access to the content item on a second client device associated with a second user account authorized to access the content item;
determining that the content item is a shared content item and is not assigned to a first user account associated with the first client device;
generating, based on the determination that the content item is the shared content item, an altered key ID from the original key ID for the content item; and
determining that the first client device is not authorized to access the content item based on the altered key ID.

10. The method of claim 9, wherein the first client device is configured to use shared content items.

11. The method of claim 9, wherein the original key ID comprises a set of bits and wherein generating the altered key ID comprises at least one of
incrementing or decrementing the original key ID, and
incrementing, decrementing, or flipping at least one specified bit of the set of bits.

12. The method of claim 9, further comprising determining that the content item is the shared content item based on an indication associated with the content item.

13. The method of claim 12, wherein the indication comprises one of a shared flag or tag.

14. The method of claim 9, further comprising determining that the first client device is not authorized to access the content item based on a determination that the altered key ID does not identify any DRM keys stored on the first client device.

15. The method of claim 14, further comprising:
determining not to attempt to decrypt the content item based on the determination that the altered key ID does not identify any DRM keys stored on the first client device; and
generating an error message for display.

16. A non-transitory computer-readable medium comprising instructions that, when executed by a first client device, cause the first client device to:
receive a request to access a content item downloaded to the first client device,
wherein an original key identifier (ID) corresponds to the content item and the original key ID identifying a first digital rights management (DRM) key that enables access to the content item on a second client device associated with a second user account authorized to access the content item;
determine that the content item is a shared content item and is not assigned to a first user account associated with the first client device;
generate, based on the determination that the content item is the shared content item, an altered key ID from the original key ID for the content item; and
determine that the first client device is not authorized to access the content item based on the altered key ID.

17. The non-transitory computer-readable medium of claim 16, wherein the first client device is configured to use shared content items.

18. The non-transitory computer-readable medium of claim 16, wherein the instructions further cause the first client device to determine that the first client device is not authorized to access the content item based on a determination that the altered key ID does not identify any DRM keys stored on the first client device.

19. The non-transitory computer-readable medium of claim 16, wherein the instructions further cause the first client device to determine that the content item is the shared content item based on an indication associated with the content item.

20. The non-transitory computer-readable medium of claim 19, wherein the indication comprises one of a shared flag or tag.

* * * * *